(12) United States Patent
Deragon et al.

(10) Patent No.: US 12,143,670 B2
(45) Date of Patent: *Nov. 12, 2024

(54) METHODS, SYSTEMS, ARTICLES OF MANUFACTURE AND APPARATUS TO REMAP HOUSEHOLD IDENTIFICATION

(71) Applicant: The Nielsen Company (US), LLC, New York, NY (US)

(72) Inventors: Joshua T. Deragon, Oldsmar, FL (US); Denis Voytenko, Oldsmar, FL (US); Paul J. Chimenti, Tampa, FL (US); Thomas Harrington, New York, NY (US); Jack Barbey, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,369

(22) Filed: Apr. 19, 2023

(65) Prior Publication Data
US 2023/0379540 A1 Nov. 23, 2023

Related U.S. Application Data

(63) Continuation of application No. 17/397,208, filed on Aug. 9, 2021, now Pat. No. 11,671,663, which is a
(Continued)

(51) Int. Cl.
*H04N 21/45* (2011.01)
*G06F 17/16* (2006.01)
*H04N 21/258* (2011.01)

(52) U.S. Cl.
CPC ......... *H04N 21/4532* (2013.01); *G06F 17/16* (2013.01); *H04N 21/25875* (2013.01); *H04N 21/25883* (2013.01)

(58) Field of Classification Search
CPC ......... H04N 21/4532; H04N 21/25875; H04N 21/25883; G06F 17/16; G06Q 30/0201; H04H 60/45
See application file for complete search history.

(56) References Cited

U.S. PATENT DOCUMENTS

| | | | | |
|---|---|---|---|---|
| 6,286,005 | B1 * | 9/2001 | Cannon | G06Q 30/0201 455/2.01 |
| 8,229,888 | B1 * | 7/2012 | Roskind | H04N 21/6582 707/634 |

(Continued)

FOREIGN PATENT DOCUMENTS

KR 20160087263 A 7/2016

OTHER PUBLICATIONS

United States Patent and Trademark Office, "Notice of Allowance and Fees(s) Due", issued in connection with U.S. Appl. No. 16/908,452, mailed on Mar. 23, 2021, 8 pages.
(Continued)

*Primary Examiner* — Timothy R Newlin

(57) ABSTRACT

An example apparatus includes a distance matrix generator to determine a number of remapping combinations corresponding to a first and a second household demographic model, generate (a) a first age-based household demographic model and a second age-based household demographic model and (b) a third age-based household demographic model and a fourth age-based household demographic model, generate a first distance matrix corresponding to the first and the third age-based household demographic model, and generate a second distance matrix corresponding to the second and the fourth age-based household demographic model, a distance matrix identifier to determine a first and a second reassignment distance and a person identification assigner to assign a person identification number of a first person corresponding to the first household to a second
(Continued)

person corresponding to the second household based on the first distance matrix or the second distance matrix.

20 Claims, 10 Drawing Sheets

Related U.S. Application Data continuation of application No. 16/908,452, filed on Jun. 22, 2020, now Pat. No. 11,089,366.

(60) Provisional application No. 62/947,352, filed on Dec. 12, 2019.

(56) References Cited

U.S. PATENT DOCUMENTS

| | | | |
|---|---|---|---|
| 9,277,275 B1* | 3/2016 | Arini | H04L 67/535 |
| 9,332,305 B1* | 5/2016 | Lee | H04N 21/4131 |
| 9,781,456 B2* | 10/2017 | Rowe | H04N 21/441 |
| 9,838,754 B2* | 12/2017 | Goli | H04N 21/4661 |
| 11,089,366 B2 | 8/2021 | Deragon et al. | |
| 11,671,663 B2 | 6/2023 | Deragon et al. | |
| 2003/0101449 A1* | 5/2003 | Bentolila | G06Q 30/0251 |
| | | | 348/E7.07 |
| 2004/0088734 A1* | 5/2004 | Donlan | H04N 21/64307 |
| | | | 348/E7.071 |
| 2004/0098744 A1* | 5/2004 | Gutta | H04N 21/6582 |
| | | | 725/39 |
| 2006/0168613 A1* | 7/2006 | Wood | H04H 60/45 |
| | | | 725/9 |
| 2007/0011040 A1* | 1/2007 | Wright | H04H 60/52 |
| | | | 455/2.01 |
| 2008/0059390 A1* | 3/2008 | Cox | H04N 21/44222 |
| | | | 706/12 |
| 2009/0133058 A1* | 5/2009 | Kouritzin | H04H 60/66 |
| | | | 725/34 |
| 2009/0265729 A1 | 10/2009 | Weinblatt | |
| 2012/0072940 A1* | 3/2012 | Fuhrer | H04N 21/25891 |
| | | | 725/13 |
| 2013/0103625 A1 | 4/2013 | Tateno et al. | |
| 2013/0254787 A1* | 9/2013 | Cox | H04N 21/252 |
| | | | 725/13 |
| 2014/0280888 A1* | 9/2014 | McMillan | G06Q 30/02 |
| | | | 709/224 |
| 2015/0229979 A1* | 8/2015 | Wood | H04N 21/4663 |
| | | | 725/14 |
| 2016/0037201 A1* | 2/2016 | Kitts | H04N 21/812 |
| | | | 725/35 |
| 2016/0198129 A1* | 7/2016 | Proud | A61B 5/1118 |
| | | | 348/143 |
| 2016/0269783 A1* | 9/2016 | Mowrer | H04N 21/42203 |
| 2017/0188067 A1* | 6/2017 | Sullivan | H04N 21/4667 |
| 2018/0249208 A1* | 8/2018 | Sheppard | H04N 21/4667 |
| 2018/0322363 A1* | 11/2018 | Urmanov | G06F 18/23213 |
| 2019/0057403 A1* | 2/2019 | Sheppard | H04N 21/258 |
| 2019/0058911 A1 | 2/2019 | McMillan | |
| 2019/0116392 A1* | 4/2019 | Vinson | H04N 21/258 |
| 2019/0278850 A1* | 9/2019 | Atasu | G06F 16/3347 |
| 2019/0356955 A1 | 11/2019 | Nagaraja Rao et al. | |

OTHER PUBLICATIONS

International Searching Authority, "Written Opinion," issued in connection with International Patent Application No. PCT/US2020/063792, mailed on Apr. 7, 2021, 4 pages.

International Searching Authority, "International Search Report", issued in connection with International Patent Application No. PCT/US2020/063792, Apr. 7, 2021, 4 pages.

International Searching Authority, "International Preliminary Report on Patentability", issued in connection with International Patent Application No. PCT/US2020/063792, May 17, 2022, 5 pages.

United States Patent and Trademark Office, "Non-Final Rejection," issued in connection with U.S. Appl. No. 17/397,208, mailed on Jul. 8, 2022, 5 pages.

United States Patent and Trademark Office, "Notice of Allowance," issued in connection with U.S. Appl. No. 17/397,208, mailed on Jan. 19, 2023, 5 pages.

United States Patent and Trademark Office, "Corrected Notice of Allowability," issued in connection with U.S. Appl. No. 17/397,208, mailed on May 5, 2023, 2 pages.

* cited by examiner

| PERSON ID | AGE BUCKET | GENDER | HEAD OF HOUSEHOLD FLAG | LONG TERM VISITOR FLAG |
|---|---|---|---|---|
| 1 | 55_64 | F | N | N |
| 2 | 25_34 | M | Y | N |
| 3 | 25_34 | F | N | N |
| 4 | 25_34 | M | N | N |
| 5 | 0_12 | F | N | N |
| 6 | 0_12 | F | N | N |
| 7 | 0_12 | M | N | N |
| 8 | 18_24 | F | N | Y |

FIG. 3A

| PERSON ID | AGE BUCKET | GENDER | HEAD OF HOUSEHOLD FLAG | LONG TERM VISITOR FLAG |
|---|---|---|---|---|
| 1 | 25_34 | M | N | N |
| 2 | 25_34 | M | Y | N |
| 3 | 13_18 | M | N | N |
| 4 | 13_18 | F | N | N |
| 5 | 0_12 | F | N | N |
| 6 | 0_12 | F | N | N |
| 7 | 25_34 | F | N | Y |

| PERSON ID | AGE BUCKET | GENDER | HEAD OF HOUSEHOLD FLAG | LONG TERM VISITOR FLAG |
|---|---|---|---|---|
| 1 | 7 | 0 | 0 | 0 |
| 2 | 4 | 0.9 | 0.05 | 0 |
| 3 | 4 | 0 | 0 | 0 |
| 4 | 4 | 0.9 | 0 | 0 |
| 5 | 1 | 0 | 0 | 0 |
| 6 | 1 | 0 | 0 | 0 |
| 7 | 1 | 0.9 | 0 | 0 |
| 8 | 3 | 0 | 0 | 0.04 |

| PERSON ID | AGE BUCKET | GENDER | HEAD OF HOUSEHOLD FLAG | LONG TERM VISITOR FLAG |
|---|---|---|---|---|
| 1 | 4 | 0.9 | 0 | 0 |
| 2 | 4 | 0.9 | 0.05 | 0 |
| 3 | 2 | 0.9 | 0 | 0 |
| 4 | 2 | 0 | 0 | 0 |
| 5 | 1 | 0 | 0 | 0 |
| 6 | 1 | 0 | 0 | 0 |
| 7 | 4 | 0 | 0 | 0.04 |

FIG. 4B

| | PERSON ID | AGE BUCKET | GENDER | HEAD OF HOUSEHOLD FLAG | LONG TERM VISITOR FLAG |
|---|---|---|---|---|---|
| 314 | 2 | 25_34 | M | Y | N |
| 316 | 3 | 25_34 | F | N | N |
| 318 | 4 | 25_34 | M | N | N |
| 320 | 5 | 0_12 | F | N | N |
| 322 | 6 | 0_12 | F | N | N |
| 324 | 7 | 0_12 | M | N | N |
| 326 | 8 | 18_24 | F | N | Y |
| 312 | 1 | 55_64 | F | N | N |

FIG. 7A

| | PERSON ID | AGE BUCKET | GENDER | HEAD OF HOUSEHOLD FLAG | LONG TERM VISITOR FLAG |
|---|---|---|---|---|---|
| 354 | 2 | 25_34 | M | Y | N |
| 364 | 3 | 25_34 | F | N | Y |
| 352 | 4 | 25_34 | M | N | N |
| 360 | 5 | 0_12 | F | N | N |
| 362 | 6 | 0_12 | F | N | N |
| 356 | 7 | 13_18 | M | N | N |
| 358 | 8 | 13_18 | F | N | N |

FIG. 7B

METHODS, SYSTEMS, ARTICLES OF MANUFACTURE AND APPARATUS TO REMAP HOUSEHOLD IDENTIFICATION

CROSS REFERENCE TO RELATED APPLICATIONS

This patent arises from a continuation of U.S. patent application Ser. No. 17/397,208, now U.S. Pat. No. 11,671,663, which was filed on Aug. 9, 2021, which claims the benefit of U.S. patent application Ser. No. 16/908,452, now U.S. Pat. No. 11,089,366, which was filed on Jun. 22, 2020, which claims the benefit of U.S. Provisional Patent Application Ser. No. 62/947,352, which was filed on Dec. 12, 2019. U.S. patent application Ser. No. 17/397,208, U.S. patent application Ser. No. 16/908,452, and U.S. Provisional Patent Application Ser. No. 62/947,352 are hereby incorporated herein by reference in their entireties. Priority to U.S. patent application Ser. No. 17/397,208, U.S. patent application Ser. No. 16/908,452, and U.S. Provisional Patent Application Ser. No. 62/947,352 are hereby claimed.

FIELD OF THE DISCLOSURE

This disclosure relates generally to household identification mapping, and, more particularly, to methods, systems, articles of manufacture and apparatus to remap household identification.

BACKGROUND

In recent years, audience measurement entities (AMEs) have developed household demographic models. Household demographic models often include individual level characterization, including assigning person identification numbers and corresponding features to each individual of a household. AMEs may remodel household demographic models over time.

BRIEF DESCRIPTION OF THE DRAWINGS

FIGS. 3A-3B are diagrams representative of an example household demographic model.

FIGS. 4A-4B are diagrams representative of an example weighted household demographic model of FIGS. 3A-B.

FIGS. 7A-7B are diagrams representative of an example reassigned household demographic model of FIGS. 3A-3B.

The figures are not to scale. Instead, the thickness of the layers or regions may be enlarged in the drawings. In general, the same reference numbers will be used throughout the drawing(s) and accompanying written description to refer to the same or like parts.

Figure 1:
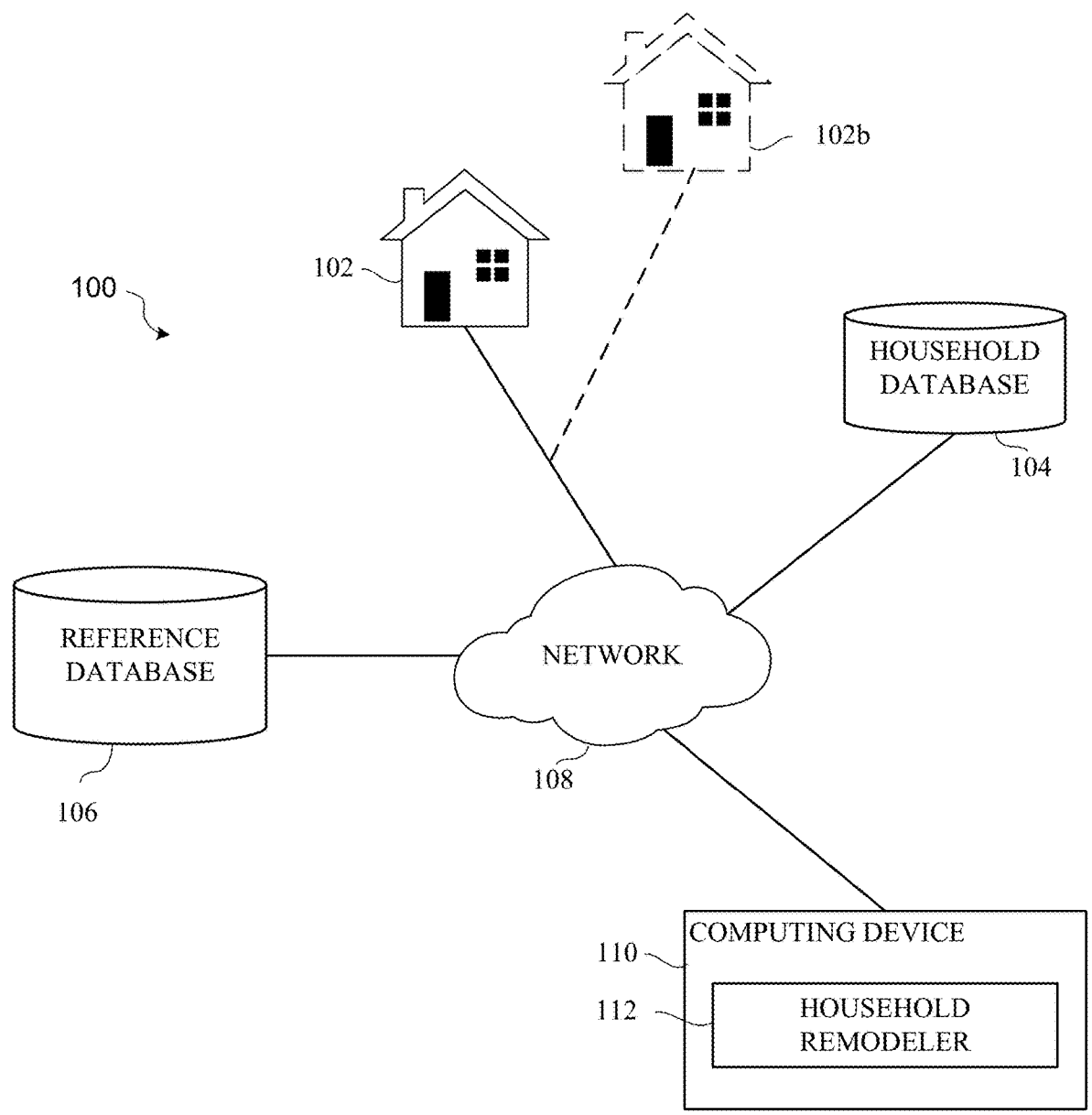
FIG. 1 illustrates an example household identification mapping system constructed in accordance with the teachings of this disclosure to remap household identification.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, the need for household demographic remodeling has risen in the audience measurement realm. Household demographic models allow audience measurement entities (AMEs) to characterize individual households for media monitoring. The household demographic models may characterize each individual of the household with person identification numbers, for which each individual is associated with any number of characteristics (e.g., features, etc.), such as age, gender, etc. Such modeling allows the AMEs to more specifically and/or otherwise accurately credit media events (e.g., media consumption instances) to certain demographics.

However, a household may change over time, causing the previously generated household demographic model to less accurately represent the individuals of the household. AMEs may also consider changes in market level data (e.g., demographic data of one or more households), which may reflect the household demographic models. For example, market level data may include data of one or more households of a certain geographic region, household data of a third-party, etc. In some examples, the AME may determine whether the household reflects and/or matches the market level data. For example, individuals may move out of a household, individuals may change age range, etc. This creates a need to remodel the households to achieve household level accuracy and market level distribution accuracy. As used herein, "remodeling" a household refers to reassigning (e.g., remapping) person identification numbers from a first household (e.g., original model) to a second household (e.g., updated model).

Existing methods of household remodeling often assign person identification numbers in an inconsistent and/or otherwise arbitrary way. Such inconsistent remodeling efforts are typically guided by one or more market analysts and/or other market research personnel. Even if a first market analyst manages to design a remapping strategy in a relatively accurate manner, a second market analyst will still have the discretionary freedom to apply alternate remapping strategies. Such discretionary behavior results in inconsistent results across and/or within market geographies of interest. This also creates inconsistencies in household data analysis (e.g., monitoring media) for the same household over time. That is, an arbitrary reassignment of person identification numbers can create errors and/or generate unnecessary variability between household demographic models. Additionally, to properly represent a household at a person-level, person identification numbers should consistently map to the most similar person in that household from a previously remodeled representation of that household.

Improving the consistency of identification number mapping reduces the remapping error and overall variation of demographics in a remodel effort.

In the illustrated example of FIG. 1, a household identification mapping system 100 includes an example original household 102, an example modified household 102b, an example household database 104, an example reference database 106, an example network 108, an example computing device 110, and an example household remodeler 112.

In the illustrated example of FIG. 1, the original household 102 includes individuals of the original household 102. In some examples, the original household 102 is the first, current, etc. household. In some examples, the individuals associated with the original household 102 are residents, visitors, etc. As disclosed herein, the original household 102 is a return path data (RPD) household. That is, RPD households use one or more devices (e.g., set-top-boxes (STBs)) to obtain media from a media distributor, and those same devices facilitate an ability to send some data back to the distributor(s). In some examples, the RPD households (HHs) are panelist households, and in some examples the RPD HHs are not associated with panelist cultivation activities. While one original household 102 is illustrated in FIG. 1, the household identification mapping system 100 may include any number of original households 102.

In the illustrated example of FIG. 1, the modified household 102b includes individuals of the modified household 102b. In examples disclosed herein, the modified household 102b is the original household 102 at a second time period. That is, the modified household 102b is an updated (e.g., remodeled) version of the original household 102. In some examples, the modified household 102b is the original household 102 a month later, a year later, etc. The modified household 102b may include some or all of the individuals of the original household 102. Additionally or alternatively, the modified household 102b may include additional individuals not included in the original household 102. For example, the original household 102 may include a first individual (e.g., a father), a second individual (e.g., a mother), and a third individual (e.g., a high school senior). The modified household 102b may include the first individual (e.g., the father), the second individual (e.g., the mother), and a fourth individual (e.g., a grandparent). The modified household 102b does not include the third individual (e.g., the high school senior may have moved to college, etc.) and includes the new fourth individual (e.g., the grandparent may have moved into the original household 102). Thus, the modified household 102b represents the original household 102 at a later time.

In the illustrated example of FIG. 1, the household database 104 stores data associated with the original household 102 and/or the modified household 102b. For example, the household database 104 may store household demographic model(s) of the original household 102 and/or the modified household 102b, including person identification numbers and features of the individuals associated with the original household 102 and modified household 102b. In some examples, the household database 104 stores both an original household demographic model (e.g., a first or otherwise temporally earlier version of a household demographic model) of the original household 102 and a modified household demographic model (e.g., a second or otherwise temporally subsequent version of the household demographic model, in which one or more household person level changes have occurred) of the modified household 102b.

In the illustrated example of FIG. 1, the reference database 106 stores data associated with a market of interest, a geographic region of interest, etc. For example, the reference database 106 stores market level data characterizing one or more original households 102.

In the illustrated example of FIG. 1, the network 108 facilitates communication between the original household 102, the modified household 102b, the household database 104, the reference database 106, and/or the computing device 110. In some examples, any number of original households 102 and/or modified households 102b can be communicatively coupled to the reference database 106 and the computing device 110 via the network 108. The communication provided by the network 108 can be via, for example, the Internet, an Ethernet connection, USB cable, etc.

In the illustrated example of FIG. 1, the computing device 110 communicates with the original household 102, the modified household 102b, the household database 104, and the reference database 106 through the network 108. In some examples, the computing device 110 contains the household remodeler 112. In the illustrated example of FIG. 1, the computing device 110 is a server, but alternatively may be an Internet gateway, a laptop, a cellular phone, a tablet, etc.

In the illustrated example of FIG. 1, the household remodeler 112 creates a set of distance matrices associated with the household data stored in the household database 104. The household remodeler 112 may obtain the household demographic model of the original household 102. In some examples, the household remodeler 112 may determine to remap (e.g., reassign, etc.) the people identification numbers of the original household 102 to a modified household demographic model (e.g., the household demographic model of the modified household 102b). For example, the household remodeler 112 may detect a person level change in the original household 102, may be configured to update the person identification number(s) periodically (e.g., every month, every year, etc.), etc. In response to the determination to update the original household, the household remodeler 112 obtains the original household demographic model of the original household 102 and the modified household demographic model of the modified household 102b. The household remodeler 112 determines the distance matrix associated with assigning people identification numbers from the original household to the most similar individual of the modified household. That is, the household remodeler 112 generates a reassigned household demographic model (e.g., the person identification numbers of the original household assigned to the individuals of the modified household). In some examples, the household remodeler 112 is an application-specific integrated circuit (ASIC), and in some examples the household remodeler 112 is a field programmable gate array (FPGA). Alternatively, the household remodeler 112 can be software located in the firmware of the computing device 110.

Figure 2:
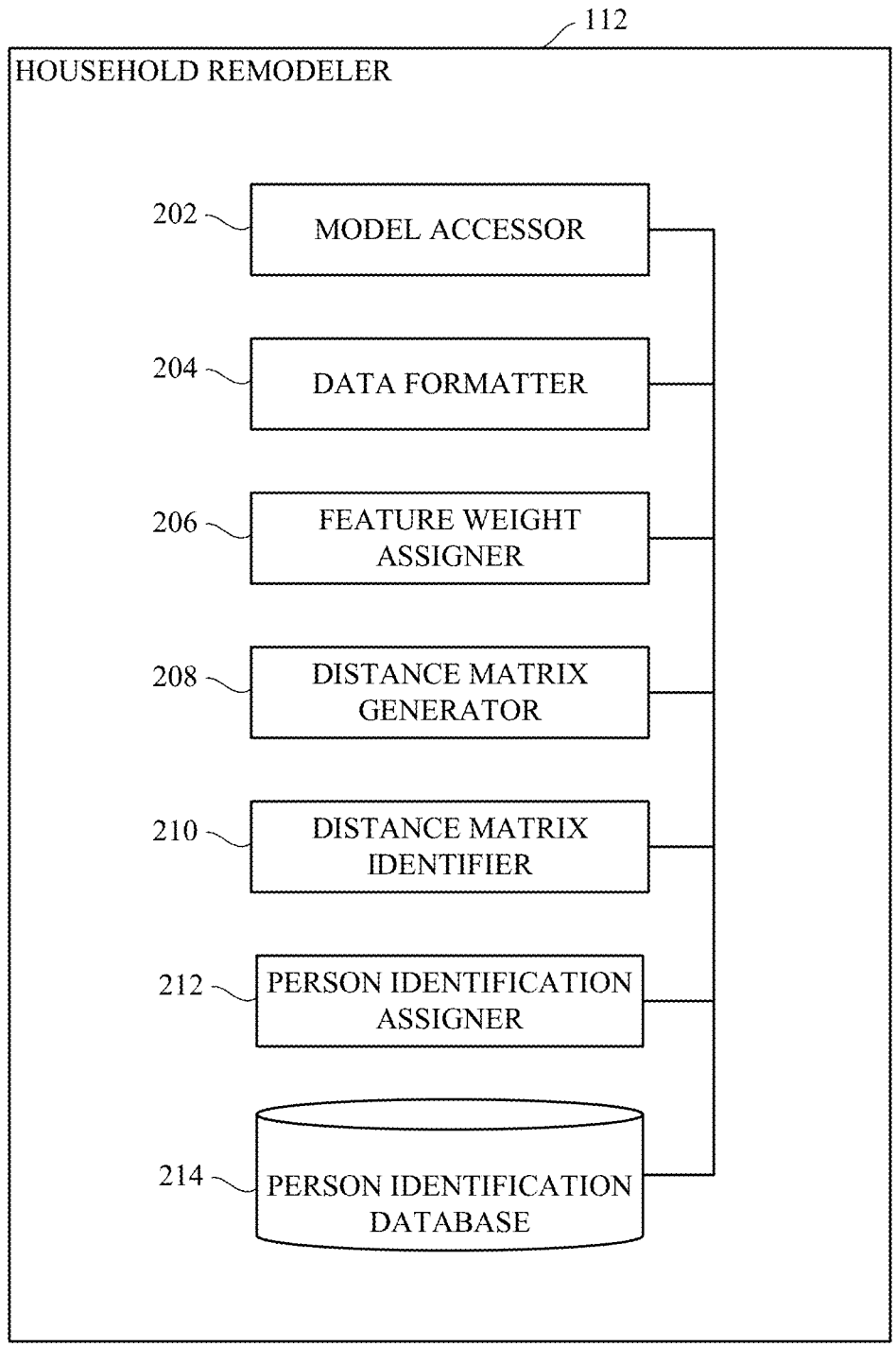
FIG. 2 is a block diagram of an example household remodeler of FIG. 1 to remap household identification.

In the illustrated example of FIG. 2, the household remodeler 112 includes an example model accessor 202 to access the household demographic model(s) of the original household 102 and modified household 102b stored in the household database 104 and/or the reference database 106. In some examples, the model accessor 202 includes means for model accessing (sometimes referred to herein as a model accessing means). The example means for model accessing is hardware. In some examples, the model accessor 202 accesses the household database 104 and/or the reference database 106 content in response to a query, on a manual basis, on a periodic basis, or on a scheduled basis.

For example, the model accessor 202 may access the household database 104 and/or the reference database 106 once a month, once a quarter, once a year, etc. to remodel the original household 102.

In the illustrated example of FIG. 2, the household remodeler 112 includes the data formatter 204 to format the household demographic model(s) accessed by the model accessor 202. In some examples, the data formatter 204 includes means for formatting (sometimes referred to herein as a formatting means). The example means for formatting is hardware. That is, the data formatter 204 formats the features within the household demographic models. For example, one feature of a household demographic model may be the individual's age. The data formatter 204 formats the age of an individual into age buckets (e.g., ranges). For example, the data formatter 204 formats the age of a six-year-old individual to the 0-12 age bucket. However, the data formatter 204 may additionally or alternatively format the age to a more granular range (e.g., 0-6, etc.) or a less granular range (e.g., 0-18, etc.). In other examples, the data formatter 204 formats a feature into a Boolean (e.g., binary) data type, such as zero or one. For example, gender may be assigned zero for a female indication and one for a male indication. In some examples, the data formatter 204 generates an adult household demographic model and a children household demographic model (e.g., the data formatter 204 separates the adults and children of a household demographic model). For example, the data formatter 204 may generate an adult household demographic model of the individuals in the household demographic model that are at least 18 years old.

In the illustrated example of FIG. 2, the household remodeler 112 includes the feature weight assigner 206 to assign weights to the features of a household demographic model. In some examples, the feature weight assigner 206 includes means for weight assigning (sometimes referred to herein as a weight assigning means). The example means for weight assigning is hardware. For example, the feature weight assigner 206 may assign each age bucket a value (e.g., the 0-12 age bucket assigned a weight of one, the 13-17 age bucket assigned a weight of two, the 18-24 age bucket assigned a weight of three, etc.), the gender feature a weight of 0.9, the head of household feature a weight of 0.05, etc. In some examples, the feature weights determine how the household identification is remapped. That is, the feature weights determine which feature defines similarity of individuals between an original household and an updated household. In the example described above, the age feature is assigned the highest weight. Thus, in this example, the household identification mapping is based primarily on age (e.g., individuals are remapped primarily according to age). In some examples, the feature weights are user defined. In some examples, the feature weights serve as a tiebreaker between two similar individuals. That is, differently weighted features may reduce the likelihood of two individuals of the original household having the same distance from one individual of the remodeled household.

In the illustrated example of FIG. 2, the household remodeler 112 includes a distance matrix generator 208 to generate distance matrices between the original household demographic model and the modified household demographic model (e.g., based on an update trigger (e.g., an update trigger scheduled for each month, etc.)). In some examples, the distance matrix generator 208 includes means for generating a distance matrix (sometimes referred to herein as a distance matrix generating means). The example means for generating a distance matrix is hardware. The distance matrix generator 208 determines the absolute difference between the person feature weight of the original household demographic model and the person feature weight of the modified household demographic model. As used herein, the absolute difference between the person feature weight of the original household demographic model and the person feature weight of the modified household demographic model is referred to as a "remapping cost". The remapping cost represents the cost of remapping the person identification number of an individual of the original household to an individual of the modified household. That is, the remapping cost can define the similarity between the individual of the original household and the individual of the modified household. For example, a relatively smaller remapping cost represents the individual of the original household is more similar to the individual of the modified household with respect to a relatively larger remapping cost.

Respective ones of the distance matrices represent multiple remapping costs of remapping a person identification number of an individual from the original household to an individual of the modified household. In examples disclosed herein, the remapping cost is the Manhattan distance between individuals of the original household and the modified household (e.g., the sum of the absolute difference between each feature of the household demographic models). In some examples, the distance matrix generator 208 generates a distance matrix for every possible combination of person identification reassignments (e.g., remapping combination). That is, if there are N individuals in the original household and M individuals in the modified household, the distance matrix generator 208 generates N factorial (e.g., N!) distance matrices if N is equal to M, N permutations of M (e.g., N! divided by M!) distance matrices if N is greater than M, or M permutations of N (e.g., M! divided by N!) distance matrices if M is greater than N.

In examples disclosed herein, the distance matrix generator 208 permutates the rows of a distance matrix to generate additional distance matrices (e.g., different remapping assignments between individuals of the original household and individuals of the modified household). That is, the distance matrix generator 208 determines remapping rows (e.g., the remapping cost of reassigning the person identification number of individual i of the original household to each of the individuals j of the modified household). Thus, the example distance matrix generator 208 permutates the remapping rows to generate one or more additional distance matrices (e.g., switch first and second remapping rows, make first remapping row last remapping row, etc.). Additionally or alternatively, the distance matrix generator 208 can permutate the columns of a distance matrix.

The example distance matrix generator 208 may also determine whether to generate separate adult and/or children distance matrices based on whether the number of distance matrices exceeds a combination threshold. For example, when the number of distance matrices exceeds the combination threshold, it may be too computationally expensive (e.g., processing time, storage space, etc.) to analyze each distance matrix. Thus, the example distance matrix generator 208 generates adult distance matrices (e.g., remapping costs between adults of the original household and modified household) and separate children distance matrices (e.g., remapping costs between children of the original household and modified household). For example, the original household includes eight total individuals with four adults and four children and the modified household includes eight total individuals with four adults and four children. If the distance matrix generator 208 generated distance matrices including both adults and children, the distance matrix generator 208 might generate 40,320 distance matrices (e.g., 8!=40,320). However, if the distance matrix generator 208 generated adult distance matrices and separate children distance matrices, the distance matrix generator 208 might generate 48 distance matrices (e.g., 4!+4!=48).

In the illustrated example of FIG. 2, household remodeler 112 includes the distance matrix identifier 210 to identify the distance matrix with a reassignment distance that is less than a reassignment threshold. In some examples, the distance matrix identifier 210 includes means for identifying a reassignment distance (sometimes referred to herein as a reassignment distance identifying means). The example means for identifying a reassignment distance is hardware. That is, the distance matrix identifier 210 identifies the reassignment distance matrix. As used herein, the "reassignment distance matrix" is the distance matrix that determines the assignments of the person identification numbers of the individuals of the original household to the individuals of the modified household. In some examples, the reassignment distance of each distance matrix is the diagonal sum of the remapping costs between individuals of the original household demographic model and the modified household demographic model (e.g., the sum of the values along the diagonal of the distance matrix). In some examples, the diagonal sum of distances of a distance matrix is the sum of the values of the main diagonal of the matrix (e.g., principal diagonal, primary diagonal, leading diagonal, major diagonal, etc.). That is, for a distance matrix A with i number of rows, j number of columns, and entries $A_{i,j}$ (e.g., the remapping cost between a first individual of the original household and a second individual of the modified household), the main diagonal of the distance matrix A includes the entries $A_{i,j}$ where i=j.

As disclosed herein, the assignment distance matrix represents an acceptable cost path for person identification number reassignment using weighted features. That is, the assignment distance matrix represents person identification number reassignments between the most similar people (e.g., defined based on the relative weighting of features) of the original household demographic model and the modified household demographic model. In some examples, the distance matrix identifier 210 identifies and/or otherwise represents a distance matrix that has a reassignment distance less than the reassignment threshold. In some examples, the distance matrix identifier 210 analyzes every distance matrix (e.g., all possible reassignments of the people identification numbers of the individuals of the original household to the individuals of the modified household) and selects the distance matrix with the minimum reassignment distance.

In the illustrated example of FIG. 2, the household remodeler 112 includes the person identification assigner 212 to assign the person identification numbers of the original household demographic model to the individuals of the modified household demographic model. In some examples, the person identification assigner 212 includes means for person assigning (sometimes referred to herein as a person assigning means). The example means for person assigning is hardware. As disclosed herein, the person identification assigner 212 assigns the person identification numbers based on the reassignment distance matrix identified by the distance matrix identifier 210. That is, using the example distance matrix A described above, the person identification assigner 212 assigns the person identification number of individual i of the original household to individual j of the modified household where i=j.

In examples disclosed herein, the reassignment distance matrix identified by the distance matrix identifier 210 (e.g., a distance matrix with an acceptable cost path) may not map every individual of the original household to the most similar individual of the modified household. For example, the original household may include two children (e.g., individuals in the 0-12 age bucket) and the modified household may include only one child. Thus, only one of the people identification numbers of the children of the original household can be reassigned to the child of the modified household (e.g., the person identification number of the second child will not be remapped to the most similar person of the modified household). However, methods, systems, articles of manufacture, and apparatus disclosed herein remap individuals based on weighted features that, when changed or remapped, have less negative influence on accuracy and/or industry expectations compared to otherwise arbitrarily remapping individuals.

In the illustrated example of FIG. 2, the household remodeler 112 includes the person identification database 214 to store the reassigned household demographic model generated by the person identification assigner 212 (e.g., the modified household demographic model with reassigned person identification numbers). In some examples, the person identification database 214 stores the original household demographic model, the modified household demographic model, and the reassigned household demographic model. In some examples, the person identification database 214 only stores the reassigned household demographic model.

While an example manner of implementing the household remodeler 112 of FIG. 1 is illustrated in FIGS. 1 and 2, one or more of the elements, processes and/or devices illustrated in FIGS. 1 and 2 may be combined, divided, re-arranged, omitted, eliminated and/or implemented in any other way. Further, the example model accessor 202, the example data formatter 204, the example feature weight assigner 206, the example distance matrix generator 208, the example distance matrix identifier 210, the example person identification assigner 212 and/or, more generally, the example household remodeler 112 of FIGS. 1 and 2 may be implemented by hardware, software, firmware and/or any combination of hardware, software and/or firmware. Thus, for example, any of the example model accessor 202, the example data formatter 204, the example feature weight assigner 206, the example distance matrix generator 208, the example distance matrix identifier 210, the example person identification assigner 212 and/or, more generally, the example household remodeler 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, model accessor 202, the example data formatter 204, the example feature weight assigner 206, the example distance matrix generator 208, the example distance matrix identifier 210, the example person identification assigner 212 and/or the example household remodeler 112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example household remodeler 112 of FIGS. 1 and/or 2 may include one or more elements, processes and/or devices in addition to, or instead of, those illustrated in FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 3A is a diagram representative of an example original household demographic model 300. The original household demographic model 300 includes person identification numbers 302 and a plurality of features (e.g., age bucket 304, gender 306, head of household flag 308, and long term visitor flag 310). However, household demographic models disclosed herein may include any number and/or type of features, such as income, type of media consumed, ethnicity, etc. The original household demographic model 300 includes feature data for eight individuals (e.g., the first individual 312, the second individual 314, the third individual 316, the fourth individual 318, the fifth individual 320, the sixth individual 322, the seventh individual 324, and the eighth individual 326). For example, the first individual 312 has a person identification number of 1, is in the 55-64 age bucket, is a female, is not the head of the household, and is not a long term visitor. In another example, the fourth individual 318 has a person identification number of 4, is in the 25-34 age bucket, is a male, is not head of the household, and is not a long term visitor. In the illustrated example of FIG. 3A, the original household demographic model 300 is partially formatted. That is, the data of the age bucket 304 feature has been formatted into a particular range. For example, the first individual 312 may be 60 years old. The data formatter 204 formats this feature of the first individual 312 into the age bucket 55_64.

FIG. 3B is a diagram representative of an example modified household demographic model 350. The modified household demographic model 350 is the modified model of the original household demographic model 300. That is, the modified household demographic model 350 models or otherwise represents the same household as the original household demographic model 300, but further represents differences in that household that may have occurred over some time (e.g., a month, a quarter, a year, etc.). For example, the modified household demographic model 350 may be the original household demographic model 300 updated a year later. The modified household demographic model 350 includes person identification numbers 302 and the same plurality of features (e.g., age bucket 304, gender 306, head of household flag 308, and long term visitor flag 310) as the original household demographic model 300. However, the modified household demographic model 350 may additionally or alternatively include features different than those of the original household demographic model 300. The modified household demographic model 350 includes seven individuals (e.g., the first individual 352, the second individual 354, the third individual 356, the fourth individual 358, the fifth individual 360, the sixth individual 362, and the seventh individual 364). In one example, the first individual 352 has a person identification number of 1, is in the age bucket 25-34, is male, is not the head of household, and is not a long term visitor. While the original household demographic model 300 and the modified household demographic model 350 model the same household, at least one of the household members is now associated with alternate information, and the modified household demographic model 350 has been updated to reflect changes to that household. For example, the modified household demographic model 350 includes seven individuals compared to the eight individuals included in the original household demographic model 300. This scenario may occur due to an individual of the original household (e.g., the original household 102 of FIG. 1) moving away, a college student returned home for the summer, an elderly parent moved into a nursing home, etc.

While the first individual 352 of FIG. 3B and the first individual 312 of FIG. 3A are both assigned the person identification number 1, they do not have the same feature data. For example, the first individual 312 corresponding to the original household demographic model 300 is in the age bucket 55-64 while the first individual 352 corresponding to the modified household demographic model 350 is in the age bucket 25-34. Thus, the first individual 312 of the original household is not the same person as the first individual 352 of the modified household. In this example, the person identification number reassignment (e.g., remapping) of the first individual 352 from the original household demographic model 300 to the modified household demographic model 350 is not reassigning person identification numbers to similar individuals. For example, the fourth individual 318 with a person identification number of 4 is in the 25-34 age bucket, is a male, is not the head of the household, and is not a long term visitor. Thus, a remapping to reduce variation between an original and modified household may instead assign the person identification number of the fourth individual 318 to the first individual 352.

FIG. 4A is a diagram representative of an example original weighted household demographic model 400. In the illustrated example, the original weighted household demographic model 400 is a weighted version of the original household demographic model 300 of FIG. 3A. That is, the original weighted household demographic model 400 includes the person identification numbers 302 and the same plurality of features (e.g., age bucket 304, gender 306, head of household flag 308, and long term visitor flag 310) as the original household demographic model 300. The original weighted household demographic model 400 includes feature data for the same eight individuals (e.g., the first individual 312, the second individual 314, the third individual 316, the fourth individual 318, the fifth individual 320, the sixth individual 322, the seventh individual 324, and the eighth individual 326) as the original household demographic model 300. In some examples, the feature weight assigner 206 of FIG. 2 generates the original weighted household demographic model 400. For example, the age bucket feature 304 does not include data indicating age ranges (e.g., 0_12, 18_24, 25_34, and 55_64 illustrated in FIGS. 3A-3B). Instead, the age bucket feature 304 of FIG. 4A has been weighted. For example, the age bucket 55_64 has been assigned a weight of 7, the age bucket range 25_34 has been assigned a weight of 4, etc. In another example, the long term visitor feature 310 has a weight of 0.04. In other words, if the individual is a long term visitor (e.g., the eighth individual 326), they are assigned a weight of 0.04, while an individual that is not a long term visitor (e.g., the first individual 312, the second individual 314, etc.) is assigned a weight of 0.

As described above, the weight of the features determines how similarity of individuals is defined. For example, the age bucket 304 feature has the highest relative weight(s) (e.g., 1, 3, 4, 7) while the long term visitor flag 310 feature has the lowest weight (e.g., 0.04). Thus, individuals are considered more similar if they are closer in age (e.g., the first individual 312 corresponding to the example original household demographic model 300, which is associated with the age range 55_64 is more similar to first individual 352 corresponding to the example modified household demographic model 350, which is associated with the age range of 25_34 than the fifth individual 360 corresponding to the example modified household demographic model 350 which is associated with the age range of 0_12).

FIG. 4B is a diagram representative of an example modified weighted household demographic model 450. In the illustrated example, the modified weighted household demographic model 450 is a weighted version of the modified household demographic model 350 of FIG. 3B. That is, the modified weighted household demographic model 450 includes the person identification numbers 302 and the same plurality of features (e.g., age bucket 304, gender 306, head of household flag 308, and long term visitor flag 310) as the modified household demographic model 350. The modified weighted household demographic model 450 includes feature data for the same seven individuals (e.g., the first individual 352, the second individual 354, the third individual 356, the fourth individual 358, the fifth individual 360, the sixth individual 362, and the seventh individual 364) as the modified household demographic model 350. In some examples, the feature weight assigner 206 of FIG. 2 generates the modified weighted household demographic model 450.

In some examples, the feature weight assigner 206 assigns the features of the modified weighted household demographic model 450 the same weights as the original weighted household demographic model 400. For example, the age bucket 304 may be assigned the relatively highest weight (e.g., 1, 2, 3, 4, 5, 6, 7) and the long term visitor feature 310 may be assigned the relatively lowest weight (e.g., 0.04). However, the feature weight assigner 206 may assign the features of the modified weighted household demographic model 450 different weights than the features of the original weighted household demographic model 400.

Figure 5:
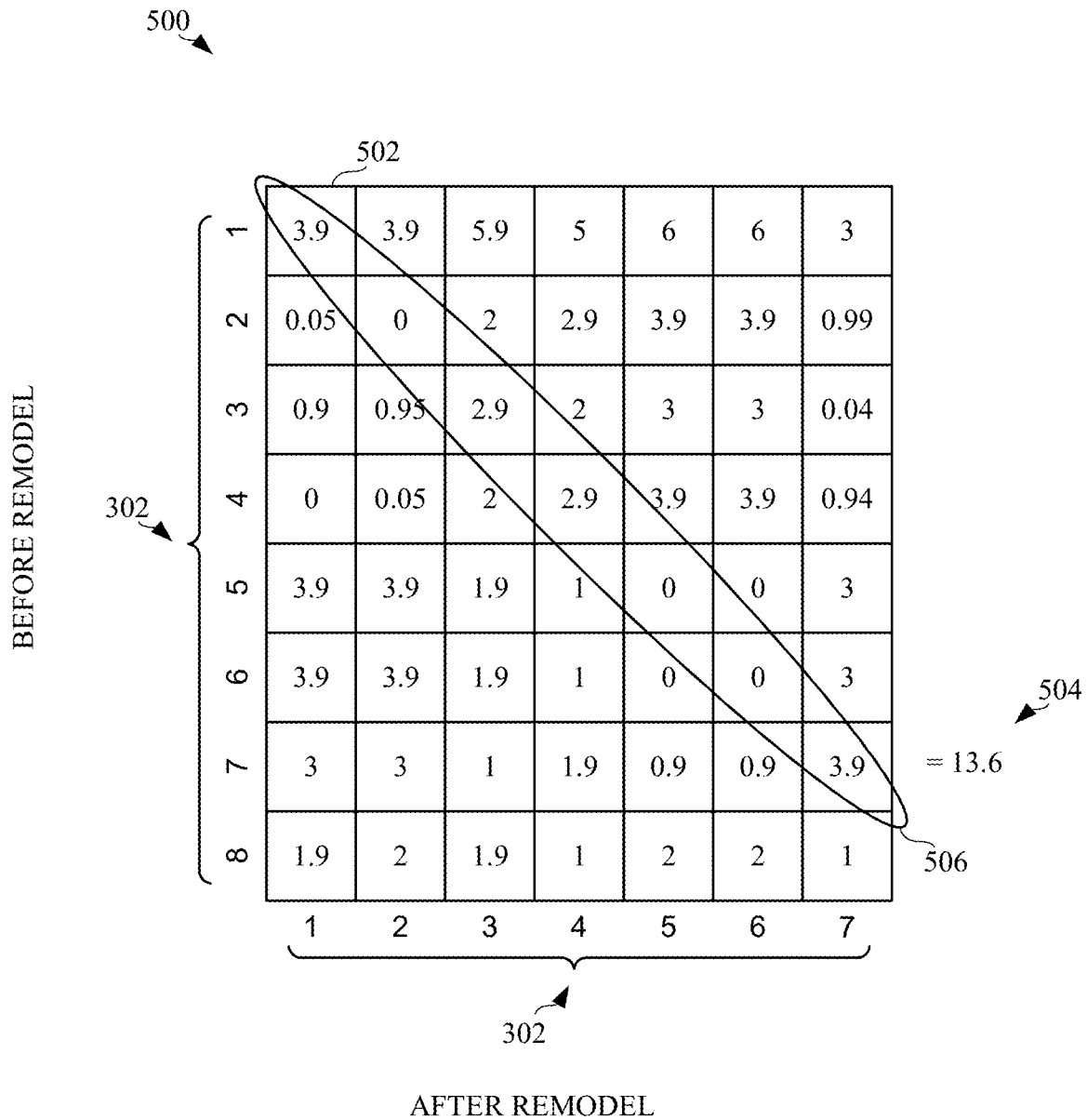
FIGS. 5-6 are diagrams representative of example distance matrices of the household of FIGS. 3A-B.

FIG. 5 is a diagram representative of an example distance matrix 500. In some examples, the distance matrix generator 208 generates the distance matrix 500. The rows of the distance matrix 500 represent the individuals of the original household (e.g., the individuals illustrated in the original household demographic model 300 and the original weighted household demographic model 400). In the illustrated example of FIG. 5, the rows are labeled with the person identification numbers 302 of the original household. The columns of the distance matrix 500 represent the individuals of the modified household (e.g., the individuals illustrated in the modified household demographic model 350 and the modified weighted household demographic model 450). In the illustrated example of FIG. 5, the columns are labeled with the person identification numbers 302 of the modified household. While the rows of the example distance matrix 500 represent individuals of the original household and the columns of the distance matrix 500 represent individuals of the modified household, in other examples the rows of the distance matrix 500 can represent individuals of the modified household and the columns of the distance matrix 500 can represent individuals of the original household.

The distance matrix 500 illustrates the remapping cost of every combination of reassigning the person identification numbers from the first household (e.g., the original household) to the individuals of the second household (e.g., the modified household). That is, one or more distance matrices may represent every combination of pairs of individuals between the original and modified households. In the illustrated example of FIG. 5, the remapping cost is the Manhattan distance between an individual of the original household and an individual of the modified household. For example, the distance matrix element 502 is the remapping cost of assigning the person identification number of the first individual 312 (e.g., 1) to the first individual 352 of the modified household. The distance matrix element 502 has a remapping cost of 3.9, which is determined by the example distance matrix generator 208 based on the absolute differences of cell values for the original and modified models (e.g., |7−4|+|0−0.9|+|0−0|+|0−0|=3.9).

The example distance matrix 500 has a reassignment distance 504 of 13.6 (e.g., 3.9+0+2.9+2.9+0+0+3.9=13.6). That is, the reassignment distance to assign the person identification number of the first individual 312 to the first individual 352, the person identification number of the second individual 314 to the second individual 354, the person identification number of the third individual 316 to the third individual 356, the person identification number of the fourth individual 318 to the fourth individual 358, the person identification number of the fifth individual 320 to the fifth individual 360, the person identification number of the sixth individual 322 to the sixth individual 362, and the person identification number of the seventh individual 324 to the seventh individual 364 is 13.6. The reassignment of person identification numbers between households of the distance matrix 500 is determined based on a main diagonal 506 of the example distance matrix 500. Thus, the reassignment distance 504 is the sum of the distance matrix elements (e.g., remapping costs) of the main diagonal 506.

In the illustrated example of FIG. 5, the distance matrix 500 has a greater number of rows (e.g., 8 rows) than columns (e.g., 7 columns). That is, there are less columns than rows due to the modified household having less individuals than the original household. For example, during the time period between the original household and the modified household, one or more individuals of the original household may have moved out (e.g., a student moving to college, a grandparent moving to a nursing home, etc.). The eighth row corresponding to the eighth individual 326 is not included in the main diagonal 506 and, thus, the reassignment distance 504 does not depend on the eighth individual 326. In other words, the person identification number of the eighth individual 326 is not assigned to any individual of the modified household (e.g., the individuals of the modified household demographic models 350, 450).

Figure 6:
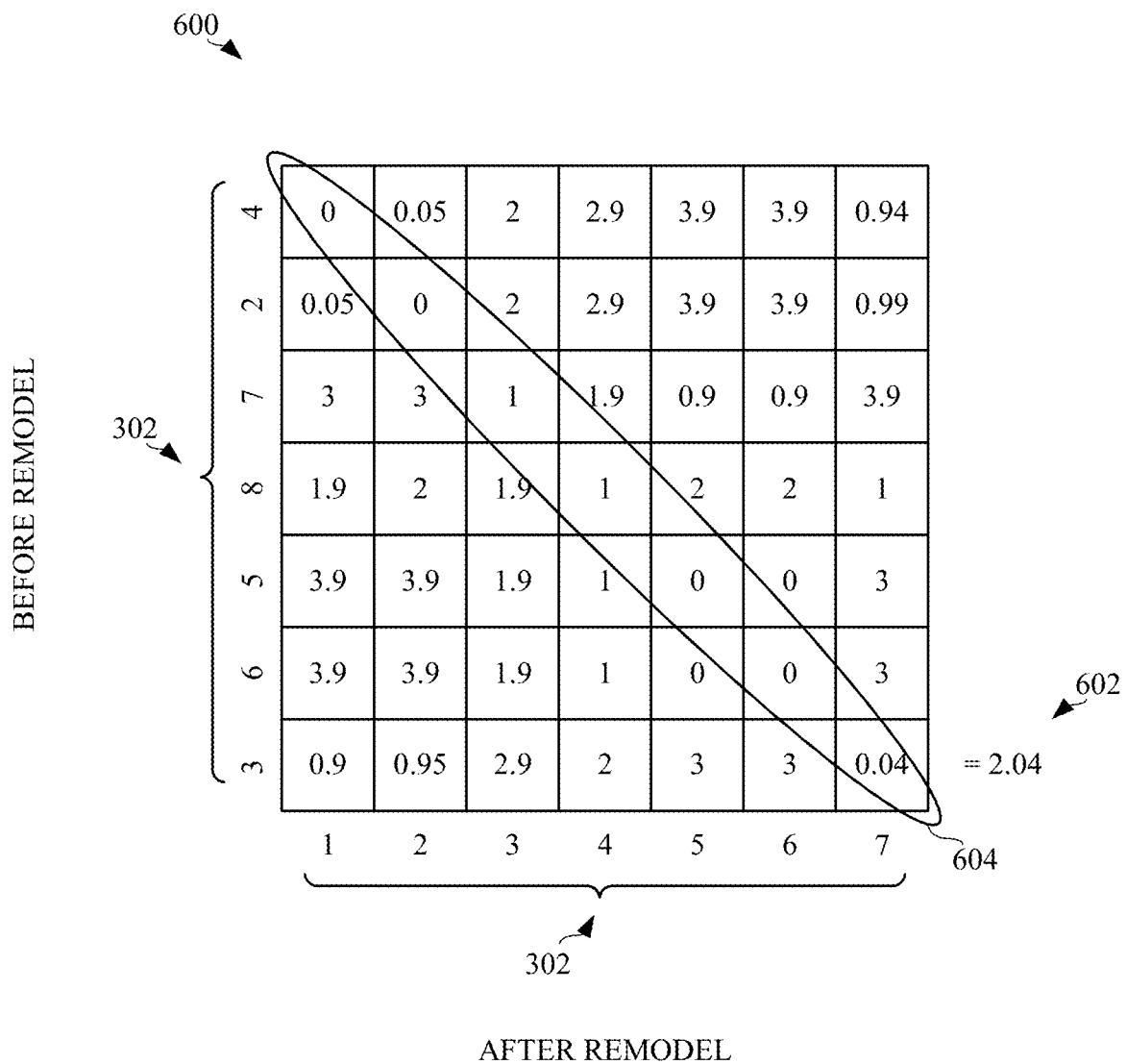

FIG. 6 is a diagram representative of an example second distance matrix 600. The second distance matrix 600 is a second distance matrix representing a second remapping of the original household (e.g., the original household demographic models 300, 400) to the modified household (e.g., the modified household demographic models 350, 450). The second distance matrix 600 may be generated to determine a second reassignment distance 602. In some examples, the distance matrix generator 208 generates the second distance matrix 600. In some examples, the distance matrix generator 208 generates any combination of distance matrices. In some other examples, the distance matrix generator 208 generates the second distance matrix 600 in response to the first distance matrix 500 having a reassignment distance greater than the reassignment threshold. As described above with reference to the example distance matrix 500 of FIG. 5, the rows of the second distance matrix 600 represent individuals of the original household (e.g., before a remodel) and the columns of the second distance matrix 600 represent individuals of the modified household (e.g., after a remodel). In the illustrated example of FIG. 6, the distance matrix generator 208 determined a second permutation of the rows of the first distance matrix 500. For example, the first row of the first distance matrix 500 is not included in the second distance matrix 600. The original household includes eight individuals and the modified household includes seven individuals (e.g., a child of the original household moves out to college, etc.). Thus, one of the person identification numbers of the original household will not get assigned to an individual of the modified household. In the illustrated example of FIG. 6, the person identification number of the first individual 312 is not reassigned to an individual of the modified household. Thus, the first row of the first distance matrix 500 is not included in the second distance matrix 600. In the illustrated example of FIG. 6, the second row of the first distance matrix 500 is the second row of the second distance matrix 600, the third row of the first distance matrix 500 is the seventh row of the second distance matrix 600, etc.

The example second distance matrix 600 of FIG. 6 has a reassignment distance 602 of 2.04. That is, the sum of a main diagonal 604 is 2.04 (e.g., 0+0+1+1+0+0+0.04). Thus, the reassignment distance to assign the person identification number of the fourth individual 318 (e.g., person identification number 4) to the first individual 352, the person identification number of the second individual 314 (e.g., the person identification number 2) to the second individual 354, the person identification number of the seventh individual 324 (e.g., the person identification number 7) to the third individual 356, the person identification number of the eighth individual 326 (e.g., the person identification number 8) to the fourth individual 358, the person identification number of the fifth individual 320 (e.g., the person identification number 5) to the fifth individual 360, the person identification number of the sixth individual 322 (e.g., the person identification number 6) to the sixth individual 362, and the person identification number of the third individual 316 (e.g., the person identification number 3) to the seventh individual 364 is 2.04. The first individual 312 (e.g., the person identification number 1) is not illustrated in the second distance matrix 600. Thus, the person identification number 1 is not assigned to an individual of the updated household.

The reassignment distance 602 of the second distance matrix 600 of FIG. 6 (e.g., 2.04) is less than the reassignment distance 504 of the distance matrix 500 of FIG. 5 (e.g., 13.6). In other words, the reassignments defined in the second distance matrix 600 result in more similar remappings (i.e., lower distance magnitude value) compared to the reassignments defined in the distance matrix 500 (i.e., a relatively higher distance magnitude value). In examples disclosed herein, the distance matrix identifier 210 of FIG. 2 may select the second distance matrix 600 in response to the second distance matrix 600 having a relatively lower reassignment distance than the distance matrix 500 (e.g., the reassignment distance matrix is the second distance matrix 600). Thus, the person identification assigner 212 may reassign the person identification numbers 302 of the original household to the individuals of the modified household according to the main diagonal 604 of the second distance matrix 600.

In the illustrated example of FIGS. 5 and 6, the example distance matrix generator 208 generated two distance matrices (e.g., the distance matrix 500 of FIG. 5 and the second distance matrix 600 of FIG. 6). The example distance matrix identifier 210 determined the second distance matrix 600 has a reassignment distance (e.g., the reassignment distance 602) that is an acceptable cost (e.g., the reassignment distance 602 is less than the reassignment threshold). Thus, the example person identification assigner 212 may assign the person identification numbers of the original household to the individuals of the modified household based on the main diagonal 604 of the second distance matrix 600. However, in other examples, the distance matrix generator 208 may generate additional distance matrices. For example, the distance matrix generator 208 may generate 40,320 distance matrices (e.g., every possible remapping combination between the person identification numbers of the original household and the individuals of the modified household). In this example, the distance matrix identifier 210 may identify the distance matrix with the lowest reassignment distance and, thus, the person identification assigner 212 assigns person identification numbers based on the corresponding distance matrix.

FIG. 7A is a diagram representative of an example projected household demographic model 700. The projected household demographic model 700 includes person identification numbers 302 and a plurality of features (e.g., age bucket 304, gender 306, head of household flag 308, and long term visitor flag 310). The projected household demographic model 700 includes feature data for eight individuals (e.g., the first individual 312, the second individual 314, the third individual 316, the fourth individual 318, the fifth individual 320, the sixth individual 322, the seventh individual 324, and the eighth individual 326). In the illustrated example, the individuals of the projected household demographic model 700 are the same individuals of the original household demographic models 300, 400. However, the example person identification assigner 212 separates (e.g., removes) the first individual 312 in the projected household demographic model 700 to illustrate the reassignments defined by the second distance matrix 600 of FIG. 6 (e.g., the person identification number 302 of the first individual 312 is not assigned to any individuals of the updated household).

FIG. 7B is a diagram representative of an example reassigned household demographic model 750. The reassigned household demographic model 750 is the reassigned model of the projected household demographic model 700. That is, the reassigned household demographic model 750 models the same household as the modified household demographic models 350, 450. The reassigned household demographic model 750 includes person identification numbers 302 and the same plurality of features (e.g., age bucket 304, gender 306, head of household flag 308, and long term visitor flag 310) as the modified household demographic models 350, 450. The reassigned household demographic model 750 includes seven individuals (e.g., the first individual 352, the second individual 354, the third individual 356, the fourth individual 358, the fifth individual 360, the sixth individual 362, and the seventh individual 364).

However, the person identification numbers 302 of the reassigned household demographic model 750 differ from the person identification numbers 302 of the modified household demographic models 350, 450. That is, the person identification assigner 212 generates the reassigned household demographic model 750 based on the example second distance matrix 600. For example, the first individual 352 (e.g., is in the 25-34 age bucket, is male, is not the head of the household, and is not a long term visitor) is assigned the person identification number 4 in the reassigned household demographic model 750. Previously (e.g., before reassignment), the first individual 352 was assigned the person identification number 1 in the modified household demographic models 350, 450 of FIGS. 3B, 4B. FIG. 7B illustrates the household demographic model of the modified household after reassignment. According to the second distance matrix 600 of FIG. 6, the first individual 352 (e.g., person identification number of 1) is assigned the person identification number of the fourth individual 318 (e.g., the person identification number of 4). Thus, the reassigned household demographic model 750 illustrates the first individual 352 is assigned the person identification number of 4. In other words, the first individual 352 of FIG. 7B is the same first individual 352 illustrated in FIGS. 3B, 4B but with an updated person identification number.

Figure 8:
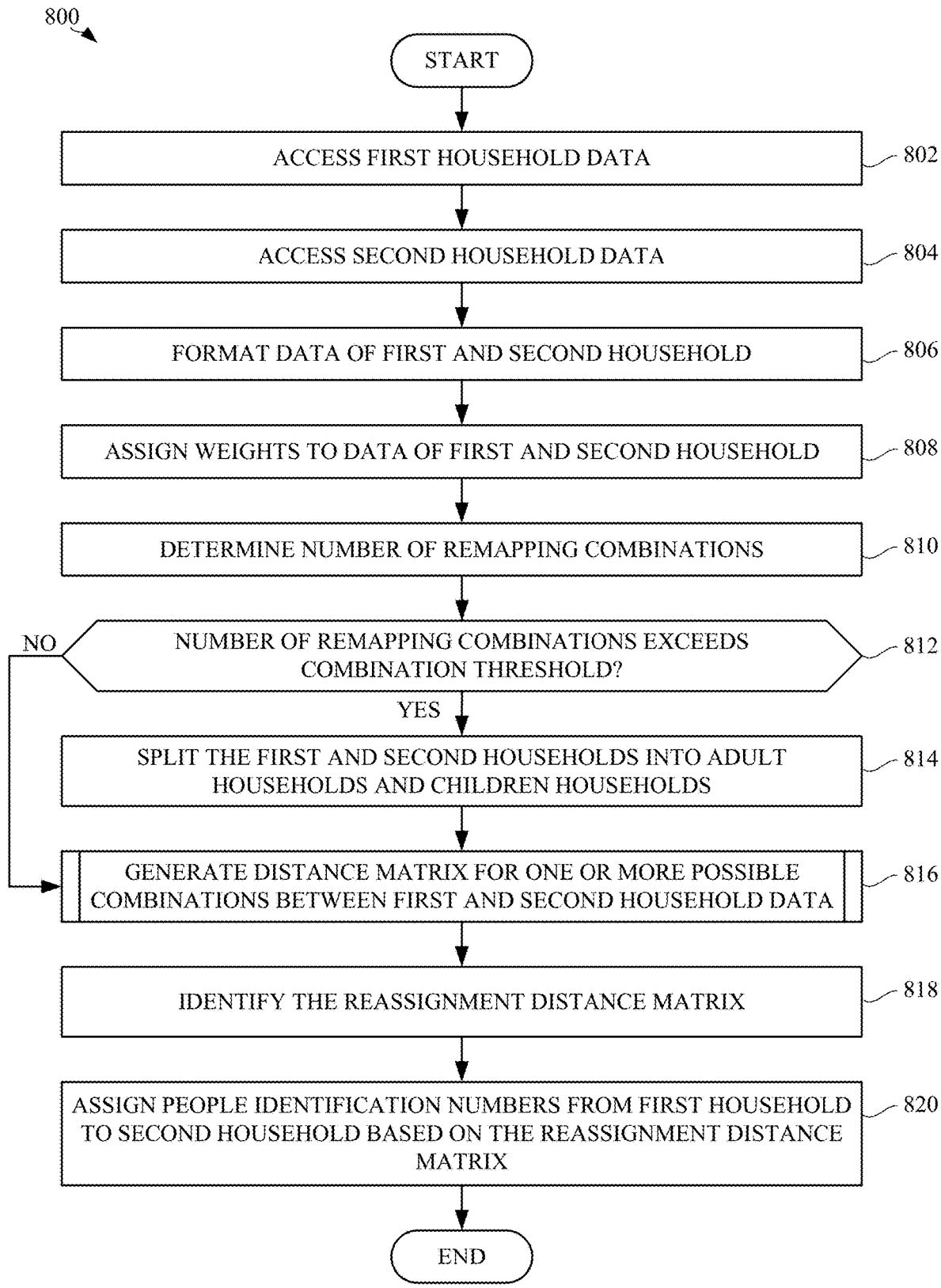
FIGS. 8-9 are flowcharts representative of example methods that may be executed by the example household remodeler of FIGS. 1 and/or 2 to remodel a household.
Figure 9:
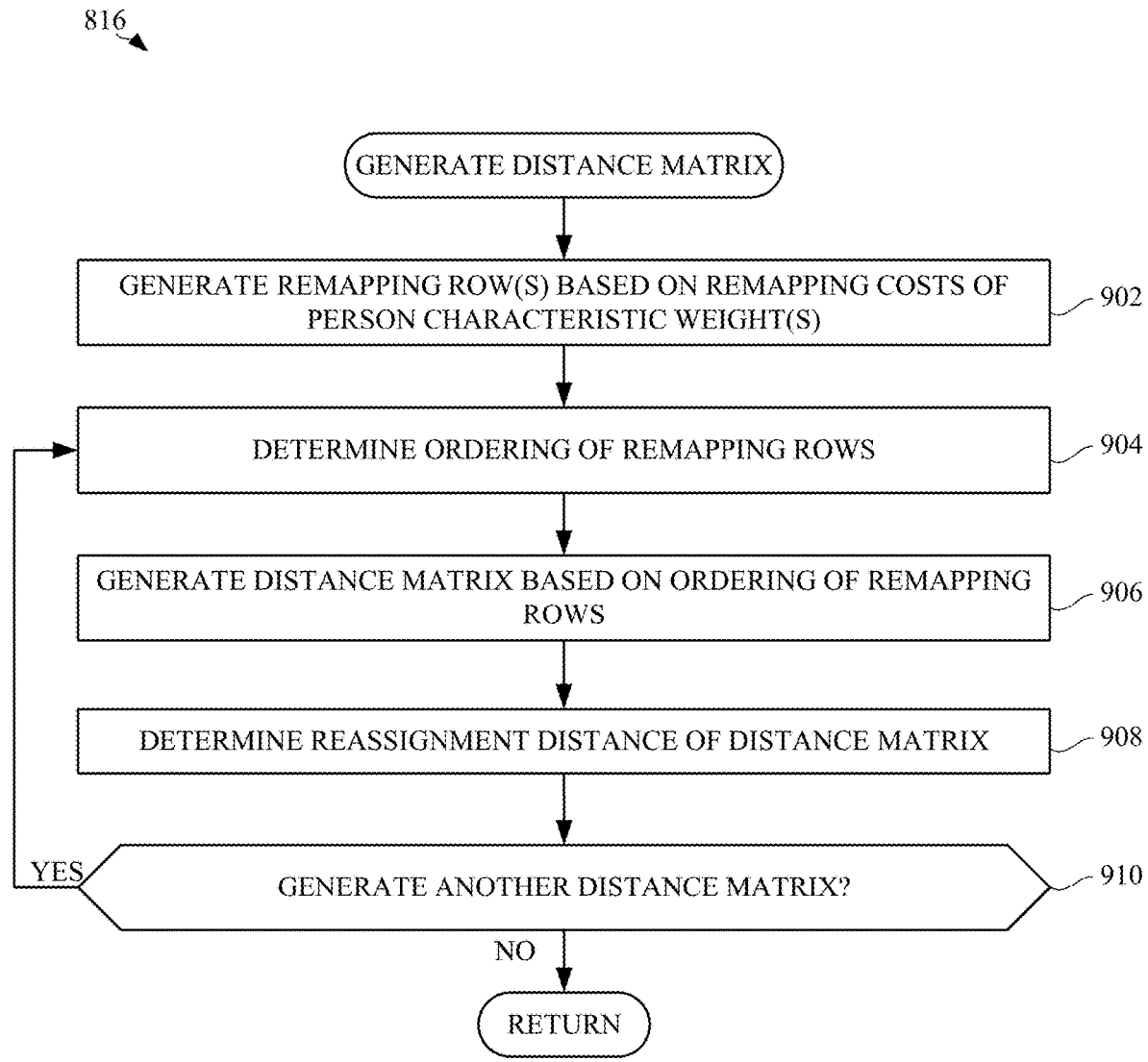

Flowcharts representative of example hardware logic, machine readable instructions, hardware implemented state machines, and/or any combination thereof for implementing the household remodeler 112 of FIGS. 1 and/or 2 are shown in FIGS. 8-9. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 8-9, many other methods of implementing the example household remodeler 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of example machine-readable instructions that may be executed to implement the household remodeler 112 of FIGS. 1 and/or 2. The example machine-readable instructions of FIG. 8 begin at block 802 at which the model accessor 202 accesses the first household data (e.g., the original household demographic model). For example, the model accessor 202 may obtain the original household demographic model 300 of FIG. 3A. At block 804, the example model accessor 202 accesses the second household data (e.g., the modified household demographic model). For example, the model accessor 202 may obtain the modified household demographic model 350 of FIG. 3B. The example model accessor 202 accesses one or more databases (e.g., the household database 104, the reference database 106, etc.) for content. In some examples, the household database 104 content includes original household demographic models and modified household demographic models. Additionally, the example reference database 106 content may include market level data associated with household demographic models. In some examples, the model accessor 202 accesses databases 104 and/or 106 in response to a household (e.g., the original household 102) being remodeled (e.g., the modified household 102b). In other examples, the model accessor 202 accesses databases 104 and/or 106 at any point during the execution of the machine-readable instructions of FIG. 8.

At block 806, the example data formatter 204 formats data of the first and second household. That is, the example data formatter 204 assigns the features of the household demographic model(s) different data types. For example, the data formatter 204 assigns the age feature an interval data type (e.g., a range). In another example, the data formatter 204 assigns the gender feature a Boolean data type.

At block 808, the example feature weight assigner 206 assigns weights to the data of the first and second households. That is, the example feature weight assigner 206 assigns weights to the features of the household demographic models. For example, the feature weight assigner 206 may assign the gender feature a weight of 0.9. In some examples, the feature weight assigner 206 assigns weights to the features of the household demographic models based on user input. For example, a user input may indicate to remap the household identification based on age and, thus, the feature weight assigner 206 assigns a greater weight to the age feature compared to other features of the household demographic model.

At block 810, the example distance matrix generator 208 determines the number of remapping combinations between the first household and the second household. In some examples, if the number of individuals between the first and second households is N (e.g., the number of individuals in the first and second households are equal), the distance matrix generator 208 determines there are N factorial (e.g., N!) number of possible person identification number reassignments. That is, there are N! different ways to reassign the person identification numbers of the first household to the individuals of the second household.

At block 812, the example distance matrix generator 208 determines whether the number of remapping combinations exceeds a combination threshold. For example, the distance matrix generator 208 compares the number of possible person remapping assignments determined at block 810 to the combination threshold. In some examples, the combination threshold is 2,000,000 remapping combinations. However, the combination threshold can be greater or less than 2,000,000. For example, in the example described above with eight individuals in the original household, there are 40,320 remapping combinations. Thus, the distance matrix generator 208 determines the number of remapping combinations does not exceed the combination threshold (e.g., 40,320<2,000,000).

If, at block 812, the distance matrix generator 208 determines the number of remapping combinations exceeds the combination threshold, then, at block 814, the data formatter 204 splits the first household and/or the second household into adult households and children households. That is, the data formatter 204 splits the first household demographic model into a first adult household demographic model and a first children household demographic model. The data formatter 204 may further split the second household demographic model into a second adult household demographic model and a second children household demographic model. In examples disclosed herein, the individuals of a household are sorted into the adult or the children household based on their age range. For example, individuals within the age range of 0-12 and 18-24 may be used to generate the children household demographic model (e.g., individuals between the ages of 0 and 24). However, in other examples, the age and/or age range used to sort individuals may be higher or lower (e.g., below 18 years old, above 18 years old, etc.). The example household remodeler 112 then proceeds to block 816.

If, at block 812, the distance matrix generator 208 determines the number of remapping combinations does not exceed the combination threshold, then, at block 816, the distance matrix generator 208 generates a distance matrix for one or more possible remapping combinations between the first and second household data. For example, the distance matrix generator 208 may generate the distance matrix 500 of FIG. 5 and/or the second distance matrix 600 of FIG. 6. In some examples, the distance matrix generator 208 generates a distance matrix for every possible combination of person identification number assignments between the original household and the modified household (e.g., the number of remapping combinations determined by the distance matrix generator 208 at block 810). In some examples, the distance matrix generator 208 generates children distance matrices and adult distance matrices if the data formatter 204 generates adult and children household demographic models (e.g., at block 814). Additional details on how the distance matrix generator 208 generates the distance matrices is further described below in connection with FIG. 9.

At block 818, the example distance matrix identifier 210 identifies the distance matrix generated by the example distance matrix generator 208 representing the most similar reassignment combination (e.g., the reassignment distance matrix). In some examples, the distance matrix identifier 210 determines the reassignment distance of each distance matrix. The distance matrix identifier 210 may determine the reassignment distance of a distance matrix as the sum of the values of the main diagonal. As disclosed herein, the distance matrix identifier 210 identifies the distance matrix associated with the lowest reassignment distance as the reassignment distance matrix. Additionally or alternatively, the distance matrix identifier 210 can identify a distance matrix with a reassignment distance below a reassignment distance threshold as the reassignment distance matrix.

At block 820, the example person identification assigner 212 assigns people identification numbers from the first household (e.g., the original household) to the second household (e.g., the modified household) based on the reassignment distance matrix determined by the example distance matrix identifier 210. That is, the example person identification assigner 212 assigns the person identification number of the individual associated with the original household (e.g., the person identification number of row i) to the individual associated with the modified household (e.g., the features of column j). In some examples, the person identification assigner 212 assigns the person identification numbers based on the main diagonal of the reassignment distance matrix (e.g., when i=j). In some examples, the person identification assigner 212 generates the reassigned household demographic model 750 of FIG. 7B at block 820. In some examples, the person identification assigner 212 stores the reassigned household demographic model in the person identification database 214.

The flowchart of FIG. 9 is representative of example machine-readable instructions that may be executed to implement block 816 of FIG. 8. The example machine-readable instructions of FIG. 9 begin at block 902 at which the distance matrix generator 208 generates remapping rows based on remapping costs of person feature weights. For example, a row of the distance matrix represents the remapping cost of reassigning the $i^{th}$ individual (e.g., a person identification number of an individual of the original household) to each of the j columns (e.g., the individuals of the modified household). In other words, a row of the distance matrix represents the remapping cost of assigning the person identification number of the $i^{th}$ individual of the original household to each of the j individuals of the modified household. In examples disclosed herein, the distance matrix generator 208 determines the remapping cost for each distance matrix element (e.g., $A_{ij}$) using the Manhattan distance between the weighted features of the first household demographic model and the second household demographic model.

At block 904, the example distance matrix generator 208 determines an ordering of the remapping rows. That is, the distance matrix generator 208 determines the row index i for each remapping row of reassignment costs determined by the distance matrix generator 208 at block 902. For example, the distance matrix generator 208 may assign a row index i based on the person identification number of the individual of the first household demographic model (e.g., the individual with a person identification number of 1 is assigned a row index of 1, the individual with a person identification number of 2 is assigned a row index of 2, etc.). In some examples, the distance matrix generator 208 may randomly (e.g., in a pseudo-random number generator) assign a row index i to each remapping row.

At block 906, the distance matrix generator 208 generates the distance matrix based on the ordering of remapping rows. For example, the distance matrix generator 208 generates the distance matrix according to the row indices i assigned to each remapping row. The example distance matrix generator 208 generates the distance matrix 500 of FIG. 5 and/or the second distance matrix 600 of FIG. 6 at block 906.

At block 908, the distance matrix identifier 210 determines the reassignment distance of the distance matrix. For example, the distance matrix identifier 210 determines the sum of the distance matrix elements (e.g., the remapping costs) of the main diagonal. The distance matrix identifier 210 determines the reassignment distance 504 of FIG. 5 and the reassignment distance 602 of FIG. 6 at block 908.

At block 910, the distance matrix generator 208 determines whether to generate another distance matrix. For example, the distance matrix generator 208 may determine to generate another distance matrix in response to the number of previously generated distance matrices being less than the number of possible remapping combinations (e.g., not every remapping combination of the first and second household has been generated). In some examples, the distance matrix generator 208 may determine to not generate another distance matrix in response to the reassignment distance of the distance matrix being less than the reassignment threshold (e.g., the distance matrix has an acceptable reassignment cost). If, at block 910, the distance matrix generator 208 determines to generate another distance matrix, the distance matrix generator 208 returns to block 904. If, at block 910, the distance matrix generator 208 determines to not generate another distance matrix, the distance matrix generator 208 returns to block 818 of process 800 of FIG. 8.

Figure 10:
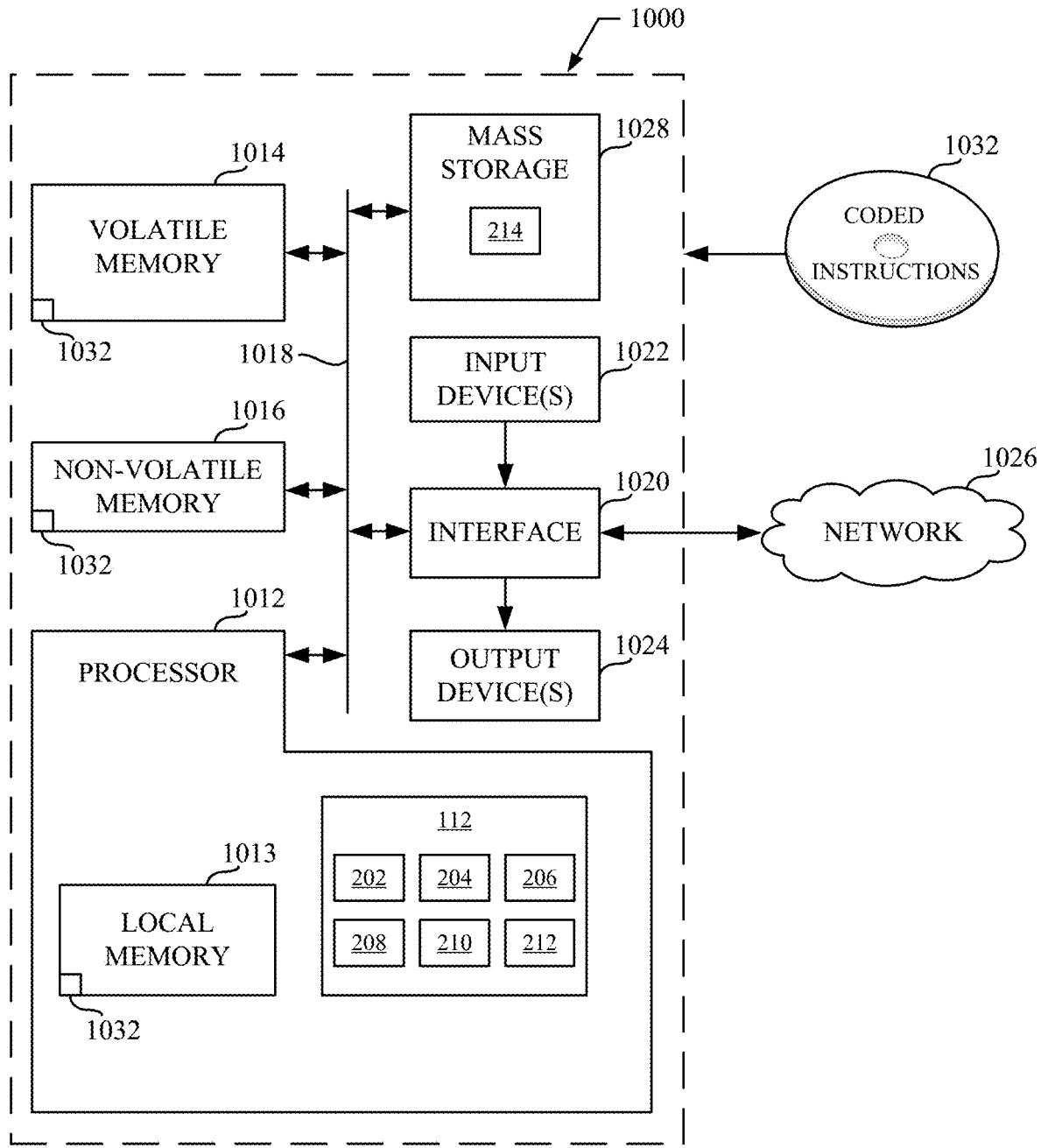
FIG. 10 is a block diagram of an example processing platform structured to execute machine readable instructions to implement the methods of FIGS. 8-9 and/or the example household remodeler of FIGS. 1 and/or 2.

FIG. 10 is a block diagram of an example processor platform 1000 structured to execute the instructions of FIGS. 8-9 to implement the household remodeler 112 of FIGS. 1 and/or 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example household remodeler 112 including the example model accessor 202, the example data formatter 204, the example feature weight assigner 206, the example distance matrix generator 208, the example distance matrix identifier 210, and the person identification assigner 212.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 8-9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that assign person identification numbers from a first household demographic model to individuals of a second household demographic model based on demographic similarities between individuals. A process to determine the feature distance (e.g., remapping cost) for every combination of individuals between a first household demographic model and a second household demographic model is used to identify a distance matrix with an acceptable reassignment distance (e.g., the reassignment distance does not exceed a reassignment threshold). As such, examples disclosed herein allow household reassignment in a manner that (a) maintains a degree of adherence to global trends while (b) reducing the deviation of household member data. The reassignment distance matrix may be used to reassign person identification numbers between the most similar individuals between a first and second household. The disclosed methods, apparatus and articles of manufacture improve the efficiency of using a computing device by autonomously generating and analyzing distance matrices between two households to remap person identification numbers. The disclosed methods, apparatus and articles of manufacture are accordingly directed to one or more improvement(s) in the functioning of a computer.

The following pertain to further examples disclosed herein. Example methods, apparatus, systems, and articles of manufacture to remap household identification are disclosed herein. Further examples and combinations thereof include the following:

Example 1 includes an apparatus to reduce a remapping error, the apparatus comprising a distance matrix generator to generate a distance matrix corresponding to a first household demographic model and a second household demographic model, a distance matrix identifier to determine a reassignment distance of the distance matrix, and a person identification assigner to, in response to the reassignment distance being less than a reassignment threshold, assign a person identification number of a first person corresponding to a first household to a second person corresponding to a second household based on the distance matrix.

Example 2 includes the apparatus as defined in example 1, wherein the first household demographic model and the second household demographic model include at least one feature of the first person and the second person.

Example 3 includes the apparatus as defined in example 2, wherein the at least one feature includes at least one of age, gender, head of household, and long term visitor.

Example 4 includes the apparatus as defined in example 2, further including a feature weight assigner to assign a first weight to a first feature and a second weight to a second feature, the first weight being greater than the second weight to define similarity between the first and second households based on the first feature.

Example 5 includes the apparatus as defined in example 1, wherein the second household demographic model is a modified version of the first household demographic model.

Example 6 includes the apparatus as defined in example 1, further including a data formatter to format the data of the first household demographic model and format the data of the second household demographic model, the data formatted using at least one of a plurality of ranges and Boolean labels.

Example 7 includes the apparatus as defined in example 1, wherein the distance matrix generator is further to generate a remapping cost between the first person of the first household and the second person of the second household.

Example 8 includes the apparatus as defined in example 7, wherein the remapping cost is a Manhattan distance.

Example 9 includes the apparatus as defined in example 1, wherein the reassignment distance is a sum of the main diagonal of the distance matrix.

Example 10 includes the apparatus as defined in example 1, wherein the distance matrix is a first distance matrix and the remapping is a first remapping, and the distance matrix generator is further to generate a second distance matrix for a second remapping between the first household demographic model and the second household demographic model.

Example 11 includes the apparatus as defined in example 10, wherein the reassignment distance is a first reassignment distance, and the distance matrix identifier is further to determine a second reassignment distance of the second distance matrix.

Example 12 includes the apparatus as defined in example 11, wherein the person identification assigner is further to, in response to the first reassignment distance being less than the second reassignment distance, assign the identification number of the first person of the first household to the second person of the second household based on the first distance matrix.

Example 13 includes the apparatus as defined in example 1, wherein the distance matrix generator is further to determine a reassignment combination number based on a number of individuals in the first household and a number of individuals in the second household.

Example 14 includes the apparatus as defined in example 13, wherein in response to the distance matrix generator determining that the number of individuals in the first household and the number of individuals in the second household are equal, assign the reassignment combination number as a factorial of the number of individuals in the first household.

Example 15 includes the apparatus as defined in example 13, wherein the distance matrix generator is further to, in response to the reassignment combination number exceeding a combination threshold, generate a first adult household demographic model, a first children household demographic model, a second adult household demographic model, and a second children household demographic model.

Example 16 includes the apparatus as defined in example 15, wherein the distance matrix generator is further to generate at least one adult distance matrix and at least one children distance matrix.

Example 17 includes a non-transitory computer readable medium comprising instructions that, when executed, cause at least one processor to, at least generate a distance matrix corresponding to a first household demographic model and a second household demographic model, determine a reassignment distance of the distance matrix, and in response to the reassignment distance being less than a reassignment threshold, assign a person identification number of a first person corresponding to a first household to a second person corresponding to a second household based on the distance matrix.

Example 18 includes the non-transitory computer readable medium as defined in example 17, wherein the first household demographic model and the second household demographic model include at least one feature of the first person and the second person.

Example 19 includes the non-transitory computer readable medium as defined in example 18, wherein the at least one feature includes at least one of age, gender, head of household, and long term visitor.

Example 20 includes the non-transitory computer readable medium as defined in example 18, wherein the instructions, when executed, further cause the at least one processor to assign a first weight to a first feature and a second weight to a second feature, the first weight being greater than the second weight to define similarity between the first and second households based on the first feature.

Example 21 includes the non-transitory computer readable medium as defined in example 17, wherein the second household demographic model is a modified version of the first household demographic model.

Example 22 includes the non-transitory computer readable medium as defined in example 17, wherein the instructions, when executed, further cause the at least one processor to format the data of the first household demographic model and format the data of the second household demographic model, the data formatted using at least one of a plurality of ranges and Boolean labels.

Example 23 includes the non-transitory computer readable medium as defined in example 17, wherein the instructions, when executed, further cause the at least one processor to generate a remapping cost between the first person of the first household and the second person of the second household.

Example 24 includes the non-transitory computer readable medium as defined in example 23, wherein the remapping cost is a Manhattan distance.

Example 25 includes the non-transitory computer readable medium as defined in example 17, wherein the reassignment distance is a sum of the main diagonal of the distance matrix.

Example 26 includes the non-transitory computer readable medium as defined in example 17, wherein the distance matrix is a first distance matrix and the remapping is a first remapping, and the instructions, when executed, further cause the at least one processor to generate a second distance matrix for a second remapping between the first household demographic model and the second household demographic model.

Example 27 includes the non-transitory computer readable medium as defined in example 26, wherein the reassignment distance is a first reassignment distance, and the instructions, when executed, further cause the at least one processor to determine a second reassignment distance of the second distance matrix.

Example 28 includes the non-transitory computer readable medium as defined in example 27, wherein the instructions, when executed, further cause the at least one processor to, in response to the first reassignment distance being less than the second reassignment distance, assign the identification number of the first person of the first household to the second person of the second household based on the first distance matrix.

Example 29 includes the non-transitory computer readable medium as defined in example 17, wherein the instructions, when executed, further cause the at least one processor to determine a reassignment combination number based on a number of individuals in the first household and a number of individuals in the second household.

Example 30 includes the non-transitory computer readable medium as defined in example 29, wherein in response to determining that the number of individuals in the first household and the number of individuals in the second household are equal, assign the reassignment combination number as a factorial of the number of individuals in the first household.

Example 31 includes the non-transitory computer readable medium as defined in example 29, wherein the instructions, when executed, further cause the at least one processor to, in response to the reassignment combination number exceeding a combination threshold, generate a first adult household demographic model, a first children household demographic model, a second adult household demographic model, and a second children household demographic model.

Example 32 includes the non-transitory computer readable medium as defined in example 31, wherein the instructions, when executed, further cause the at least one processor to generate at least one adult distance matrix and at least one children distance matrix.

Example 33 includes a method to reduce a remapping error, the method comprising generating, by executing an instruction with at least one processor, a distance matrix corresponding to a first household demographic model and a second household demographic model, determining, by executing an instruction with at least one processor, a reassignment distance of the distance matrix, and in response to the reassignment distance being less than a reassignment threshold, assigning, by executing an instruction with at least one processor, a person identification number of a first person corresponding to a first household to a second person corresponding to a second household based on the distance matrix.

Example 34 includes the method as defined in example 33, wherein the first household demographic model and the second household demographic model include at least one feature of the first person and the second person.

Example 35 includes the method as defined in example 34, wherein the at least one feature includes at least one of age, gender, head of household, and long term visitor.

Example 36 includes the method as defined in example 34, further including assigning a first weight to a first feature and a second weight to a second feature, the first weight being greater than the second weight to define similarity between the first and second households based on the first feature.

Example 37 includes the method as defined in example 33, wherein the second household demographic model is a modified version of the first household demographic model.

Example 38 includes the method as defined in example 33, further including formatting the data of the first household demographic model and format the data of the second household demographic model, the data formatted using at least one of a plurality of ranges and Boolean labels.

Example 39 includes the method as defined in example 33, further including generating a remapping cost between the first person of the first household and the second person of the second household.

Example 40 includes the method as defined in example 39, wherein the remapping cost is a Manhattan distance.

Example 41 includes the method as defined in example 33, wherein the reassignment distance is a sum of the main diagonal of the distance matrix.

Example 42 includes the method as defined in example 33, wherein the distance matrix is a first distance matrix and the remapping is a first remapping, further including generating a second distance matrix for a second remapping between the first household demographic model and the second household demographic model.

Example 43 includes the method as defined in example 42, wherein the reassignment distance is a first reassignment distance, further including determining a second reassignment distance of the second distance matrix.

Example 44 includes the method as defined in example 43, further including, in response to the first reassignment distance being less than the second reassignment distance, assigning the identification number of the first person of the first household to the second person of the second household based on the first distance matrix.

Example 45 includes the method as defined in example 33, further including determining a reassignment combination number based on a number of individuals in the first household and a number of individuals in the second household.

Example 46 includes the method as defined in example 45, wherein in response to determining that the number of individuals in the first household and the number of individuals in the second household are equal, assigning the reassignment combination number as a factorial of the number of individuals in the first household.

Example 47 includes the method as defined in example 45, further including, in response to the reassignment combination number exceeding a combination threshold, generating a first adult household demographic model, a first children household demographic model, a second adult household demographic model, and a second children household demographic model.

Example 48 includes the method as defined in example 47, further including generating at least one adult distance matrix and at least one children distance matrix.

Example 49 includes an apparatus to reduce a remapping error, the apparatus comprising means for generating a distance matrix to generate a distance matrix corresponding to a first household demographic model and a second household demographic model, means for identifying a reassignment distance to determine a reassignment distance of the distance matrix, and means for person assigning to, in response to the reassignment distance being less than a reassignment threshold, assign a person identification number of a first person corresponding to a first household to a second person corresponding to a second household based on the distance matrix.

Example 50 includes the apparatus as defined in example 49, wherein the first household demographic model and the second household demographic model include at least one feature of the first person and the second person.

Example 51 includes the apparatus as defined in example 50, wherein the at least one feature includes at least one of age, gender, head of household, and long term visitor.

Example 52 includes the apparatus as defined in example 50, further including means for weight assigning to assign a first weight to a first feature and a second weight to a second feature, the first weight being greater than the second weight to define similarity between the first and second households based on the first feature.

Example 53 includes the apparatus as defined in example 49, wherein the second household demographic model is a modified version of the first household demographic model.

Example 54 includes the apparatus as defined in example 49, further including means for formatting to format the data of the first household demographic model and format the data of the second household demographic model, the data formatted using at least one of a plurality of ranges and Boolean labels.

Example 55 includes the apparatus as defined in example 49, wherein the distance matrix generating means is further to generate a remapping cost between the first person of the first household and the second person of the second household.

Example 56 includes the apparatus as defined in example 55, wherein the remapping cost is a Manhattan distance.

Example 57 includes the apparatus as defined in example 49, wherein the reassignment distance is a sum of the main diagonal of the distance matrix.

Example 58 includes the apparatus as defined in example 49, wherein the distance matrix is a first distance matrix and the remapping is a first remapping, and the distance matrix generating means is further to generate a second distance matrix for a second remapping between the first household demographic model and the second household demographic model.

Example 59 includes the apparatus as defined in example 58, wherein the reassignment distance is a first reassignment distance, and the reassignment distance identifying means is further to determine a second reassignment distance of the second distance matrix.

Example 60 includes the apparatus as defined in example 59, wherein the person assigning means is further to, in response to the first reassignment distance being less than the second reassignment distance, assign the identification number of the first person of the first household to the second person of the second household based on the first distance matrix.

Example 61 includes the apparatus as defined in example 49, wherein the distance matrix generating means is further to determine a reassignment combination number based on a number of individuals in the first household and a number of individuals in the second household.

Example 62 includes the apparatus as defined in example 61, wherein in response distance matrix generating means determining that to the number of individuals in the first household and the number of individuals in the second household are equal, assign the reassignment combination number as a factorial of the number of individuals in the first household.

Example 63 includes the apparatus as defined in example 61, wherein the distance matrix generating means is further to, in response to the reassignment combination number exceeding a combination threshold, generate a first adult household demographic model, a first children household demographic model, a second adult household demographic model, and a second children household demographic model.

Example 64 includes the apparatus as defined in example 63, wherein the distance matrix generating means is further to generate at least one adult distance matrix and at least one children distance matrix.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing system comprising a processor and a memory, the computing system configured to perform a set of acts comprising:
   accessing original household data comprising demographic features for members of a household at a first time;
   accessing modified household data comprising demographic features for members of the household at a second time, wherein a composition of the household at the first time is different from a composition of the household at a second time;
   determining multiple remapping combinations for mapping the members of the household at the first time to the members of the household at the second time;
   determining that one of the multiple remapping combinations satisfies a threshold condition; and
   mapping the members of the household at the first time to the members of the household at the second time in accordance with the remapping combination.

2. The computing system of claim 1, wherein mapping the members of the household at the first time to the members of the household at the second time comprises associating a first member of the members of the household at the first time with a second member of the members of the household at the second time.

3. The computing system of claim 2, wherein a number of the members of the household at the first time is different from a number of the members of the household at the second time.

4. The computing system of claim 1, wherein:
   the set of acts further comprises determining a remapping cost for the remapping combination, and
   determining that the remapping combination satisfies the threshold condition comprises determining that the remapping cost satisfies the threshold condition.

5. The computing system of claim 4, wherein:
   the set of acts further comprises accessing feature weights for respective types of demographics, and
   the determining the remapping cost for the remapping combination comprises determining the remapping cost based on the feature weights.

6. The computing system of claim 4, wherein determining the remapping cost comprises determining a distance matrix representing a distance between the demographic features of the members of the household at the first time and the demographic features of the members of the household at the second time when remapped in accordance with the remapping combination.

7. The computing system of claim 1, wherein the set of acts further comprises crediting a media consumption instance after mapping the members of the household at the first time to the members of the household at the second time in accordance with the remapping combination.

8. A method comprising:
   accessing, by a computing system, original household data comprising demographic features for members of a household at a first time;
   accessing, by the computing system, modified household data comprising demographic features for members of the household at a second time, wherein a composition of the household at the first time is different from a composition of the household at a second time;
   determining, by the computing system, multiple remapping combinations for mapping the members of the household at the first time to the members of the household at the second time;
   determining, by the computing system, that one of the multiple remapping combinations satisfies a threshold condition; and
   mapping, by the computing system, the members of the household at the first time to the members of the household at the second time in accordance with the remapping combination.

9. The method of claim 8, wherein mapping the members of the household at the first time to the members of the household at the second time comprises associating a first member of the members of the household at the first time with a second member of the members of the household at the second time.

10. The method of claim 9, wherein a number of the members of the household at the first time is different from a number of the members of the household at the second time.

11. The method of claim 8, further comprising determining a remapping cost for the remapping combination,
   wherein determining that the remapping combination satisfies the threshold condition comprises determining that the remapping cost satisfies the threshold condition.

12. The method of claim 11, further comprising accessing feature weights for respective types of demographics, wherein determining the remapping cost for the remapping combination comprises determining the remapping cost based on the feature weights.

13. The method of claim 11, wherein determining the remapping cost comprises determining a distance matrix representing a distance between the demographic features of the members of the household at the first time and the demographic features of the members of the household at the second time when remapped in accordance with the remapping combination.

14. The method of claim 8, further comprising crediting a media consumption instance after mapping the members of the household at the first time to the members of the household at the second time in accordance with the remapping combination.

15. A non-transitory computer-readable medium having stored therein instructions that when executed by a computing system cause the computing system to perform a set of acts comprising:
   accessing original household data comprising demographic features for members of a household at a first time;
   accessing modified household data comprising demographic features for members of the household at a second time, wherein a composition of the household at the first time is different from a composition of the household at a second time;
   determining multiple remapping combinations for mapping the members of the household at the first time to the members of the household at the second time;
   determining that one of the multiple remapping combinations satisfies a threshold condition; and
   mapping the members of the household at the first time to the members of the household at the second time in accordance with the remapping combination.

16. The non-transitory computer-readable medium of claim 15, wherein mapping the members of the household at the first time to the members of the household at the second time comprises associating a first member of the members of the household at the first time with a second member of the members of the household at the second time.

17. The non-transitory computer-readable medium of claim 16, wherein a number of the members of the household at the first time is different from a number of the members of the household at the second time.

18. The non-transitory computer-readable medium of claim 15, wherein:
   the set of acts further comprises determining a remapping cost for the remapping combination, and
   determining that the remapping combination satisfies the threshold condition comprises determining that the remapping cost satisfies the threshold condition.

19. The non-transitory computer-readable medium of claim 18, wherein:
   the set of acts further comprises accessing feature weights for respective types of demographics, and
   the determining the remapping cost for the remapping combination comprises determining the remapping cost based on the feature weights.

20. The non-transitory computer-readable medium of claim 18, wherein determining the remapping cost comprises determining a distance matrix representing a distance between the demographic features of the members of the household at the first time and the demographic features of the members of the household at the second time when remapped in accordance with the remapping combination.

\* \* \* \* \*